United States Patent [19]

Grey et al.

[11] Patent Number: 5,022,431

[45] Date of Patent: Jun. 11, 1991

[54] EXHAUST GAS RECIRCULATION VALVE ASSEMBLY

[75] Inventors: Thaddeus J. Grey; Raymond E. Kirton, both of Rochester; George A. English, Spencerport; Michael D. Liggett, Rochester; Karen M. Meyer, Avon; Charles J. Barker, Rochester, all of N.Y.

[73] Assignee: General Motors Corporation, Detroit, Mich.

[21] Appl. No.: 498,584

[22] Filed: Mar. 26, 1990

Related U.S. Application Data

[63] Continuation-in-part of Ser. No. 415,932, Sep. 27, 1989, abandoned.

[51] Int. Cl.[5] .................. F16L 7/00

[52] U.S. Cl. .................. 137/375; 251/367; 123/571; 277/235 B

[58] Field of Search .................. 251/367; 137/884, 883, 137/375; 123/571; 277/235 B

[56] References Cited

U.S. PATENT DOCUMENTS

| | | | |
|---|---|---|---|
| 1,021,681 | 3/1912 | Jennings | 137/375 |
| 1,985,473 | 7/1932 | Victor | 277/335 B |
| 4,161,187 | 7/1979 | Bauer | 137/375 |
| 4,351,285 | 9/1982 | Bradshaw | 123/568 |
| 4,694,812 | 9/1987 | Wendt | 123/571 |
| 4,725,040 | 2/1988 | Fornuto et al. | 251/129.15 |
| 4,742,989 | 5/1988 | Akagi | 251/129.05 |
| 4,782,811 | 11/1988 | Hewette et al. | 123/571 |

*Primary Examiner*—A. Michael Chambers
*Attorney, Agent, or Firm*—Karl F. Barr, Jr.

[57] ABSTRACT

An exhaust gas recirculation valve assembly for controlling the recirculation of exhaust gases in an internal combustion engine having a base with an exhaust gas chamber formed therein, a cover closing the chamber, a valve member mounted within the exhaust gas chamber for metering exhaust gas passage through the chamber, an actuator energizable to operate the valve within the exhaust gas chamber and a heat deflector assembly placed between the cover and the base to reduce heat transfer from the exhaust gas chamber to the actuator. The heat deflector assembly is constructed of a first gasket member which is configured to form a seal between the cover and the base and the second heat deflector member mounted to the lower surface of the gasket member, facing the exhaust gas chamber and separating the gasket member from direct impingement of exhaust gases thereon. As a result, durability of the insulative gasket member is ensured.

7 Claims, 3 Drawing Sheets

EXHAUST GAS RECIRCULATION VALVE ASSEMBLY

This is a continuation-in-part of Ser. No. 415,932, filed on Sept. 27, 1989 now abandoned.

BACKGROUND OF THE INVENTION

1. Field of the Invention

The present invention relates to an exhaust gas recirculation valve assembly for controlling recirculation of exhaust gases in an internal combustion engine and, more particularly, to an exhaust gas recirculation valve assembly having an internal heat deflector which reduces the transfer of heat therethrough.

2. Description of the Relevant Art

Typical automotive vehicle exhaust systems incorporate exhaust gas recirculation valve assemblies which, when actuated, allow hot exhaust gas to flow through a valve base. As a result of the exhaust gas flow, heat from the gas conducts upwardly through the valve assembly thereby raising the temperature of the valve actuator, especially in engine bays which experience low air flow. Such high temperatures are undesirable from the standpoint of durability and reliability.

SUMMARY OF THE INVENTION

In accordance with the present invention, an exhaust gas recirculation valve assembly for use in controlling the recirculation of exhaust gases in an internal combustion engine is disclosed. The assembly comprises a base having an exhaust gas chamber formed therein with inlet and outlet openings, and a valve seat surrounding one or more of the openings. The base is attached to the exhaust system of an internal combustion engine and channels exhaust gases to the intake side of the engine by allowing the gases to flow through the exhaust gas chamber. A cover sealingly closes the exhaust gas chamber to prevent the escape of exhaust gases therefrom. The cover has an opening formed therein which generally aligns with the valve seat within the base and allows for the passage of a valve stem, to one end of which is attached a valve member. The valve member operates within the exhaust gas chamber to meter exhaust gas passing therethrough. An actuator mounted above the cover is energized to operate the valve stem and corresponding valve member reciprocably into and out of engagement with the valve seat.

In order to reduce the amount of heat which is conducted from the exhaust gas chamber through the cover and upwardly to the actuator, a heat deflector assembly is disposed between the cover and the base. The heat deflector assembly is a flat, plate-like member which is seated in face-to-face engagement with the lower surface of the cover to prevent impingement of exhaust gas thereon, and has openings which generally align with the openings in the cover. The heat deflector assembly has a first plate-like gasket member which is configured to form a seal between the cover and the base, thereby preventing the escape of exhaust gases therebetween during the operation of the exhaust gas recirculation valve. The gasket member comprises a stainless steel supporting member having a layer of insulating material on each side thereof. Since the gasket material is not durable in an exhaust environment, due to the direct impingement of exhaust gas thereon, a stainless steel heat deflector plate is mounted to the lower surface of the gasket member and acts to reduce the heat transferred to the gasket member while protecting the gasket member from the deleterious effects of the exhaust gas. As a result, the gasket member, which is constructed of an insulative material, reduces the heat transferred from the base, which houses the exhaust gas chamber, to the actuator unit mounted thereon.

In applications requiring protection of the valve stem from impingement thereon of moisture and contaminants, a second embodiment of the heat deflector uses a gasket member having an oversized supporting member between the insulative layers to create an extension which is configured to extend upwardly, toward the actuator to provide a shield about the valve stem.

The present invention provides a unitary heat deflector assembly which is easy to install and which achieves a reduction in heat transfer in a cost effective manner. Additionally, due to the lowering of operating temperatures within the actuator unit, a resultant increase in durability and reliability of the valve assembly can be achieved.

Also, the provision of an integral shield extension in certain applications provides additional protection to the valve assembly thereby increasing durability and reliability without adding to the complexity of the assembly.

Other objects and features of the invention will become apparent by reference to the following description and to the drawings.

DESCRIPTION OF THE PREFERRED EMBODIMENT

Figure 1:
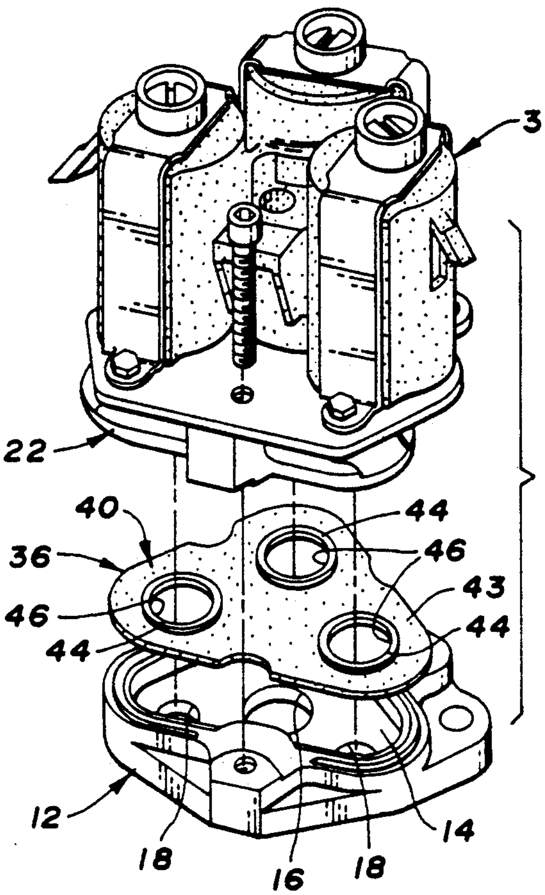
FIG. 1 is an exploded, perspective view of an exhaust gas recirculation valve assembly embodying the present invention.
Figure 4:
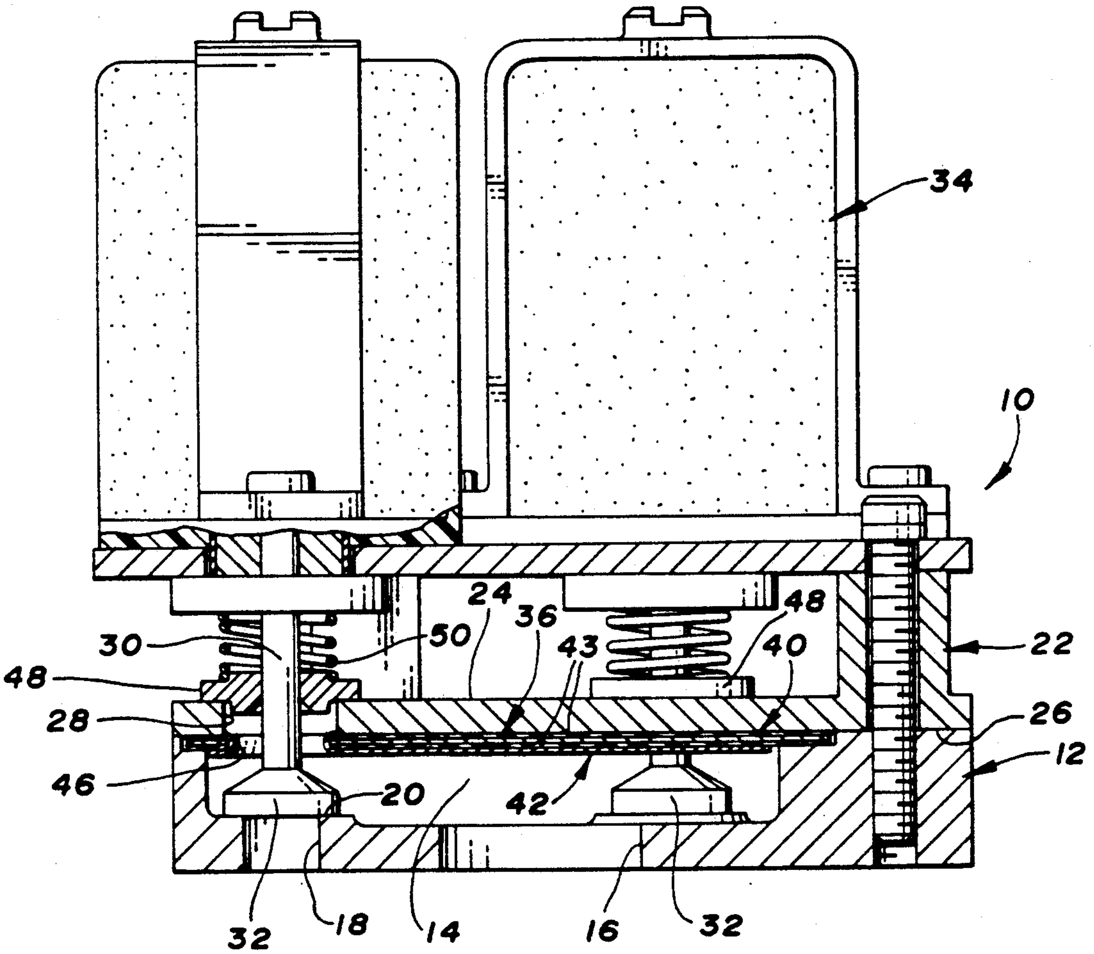
FIG. 4 is a sectional view of the exhaust gas recirculation valve assembly of FIG. 1.
Figure 5:
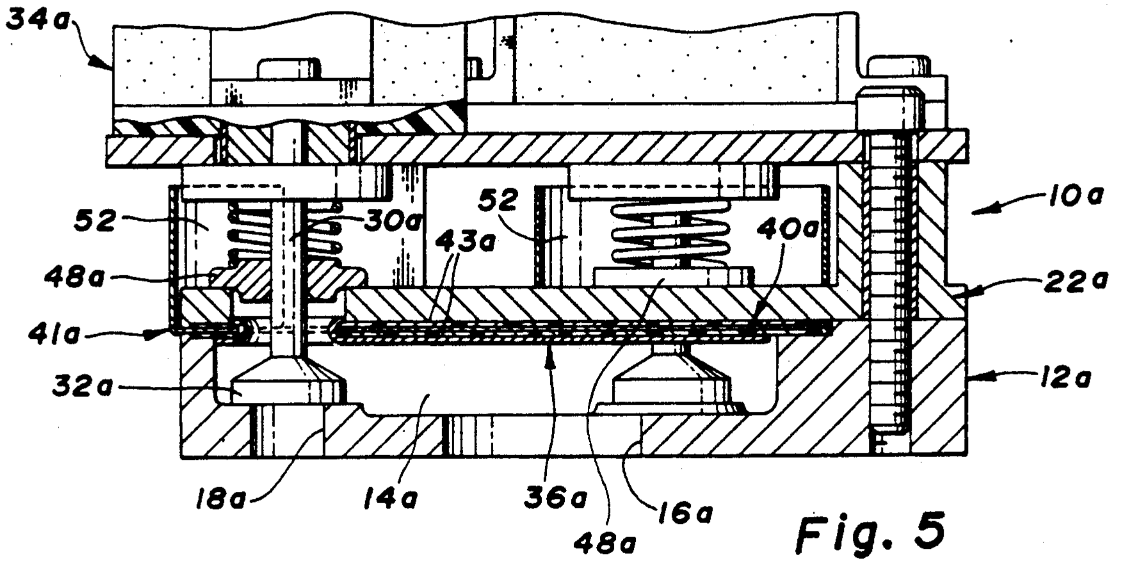
FIG. 5 is a partial sectional view of a second embodiment of an exhaust gas recirculation valve assembly embodying the present invention.

In FIGS. 1 and 4 there is shown an exhaust gas recirculation valve assembly, designated generally as 10, useful for controlling recirculation of exhaust gases in an internal combustion engine. The valve assembly 10 has a base 12 with an exhaust chamber 14 formed therein. An inlet opening 16 and an outlet opening 18 are disposed within the exhaust chamber 14 with a valve seat 20 formed about the circumference of outlet opening 18. In an alternative embodiment, the valve seat may extend about the circumference of inlet opening 16. As shown in FIGS. 1, 4, and 5 more than one outlet opening 18 or inlet opening 16 may be provided depending on the application of the valve, however, for purposes of description, one inlet opening and one outlet opening will be described.

A cover 22 having an upper surface 24 and lower surface 26 closes chamber 14. Cover 22 has an opening 28 formed therein which is generally aligned with the valve seat 20 formed in the exhaust gas chamber 14 of base 12. A valve stem 30 having a valve member 32 mounted at a first end thereof, extends through cover opening 28 with valve member 32 mounted adjacent valve seat 20.

An actuator 34, disposed at the second end of valve stem 30, is energizable to operate valve stem 30 reciprocably so as to move valve member 32 into and out of engagement with valve seat 20 thereby allowing exhaust gas to flow out of exhaust chamber 14.

Figure 2:
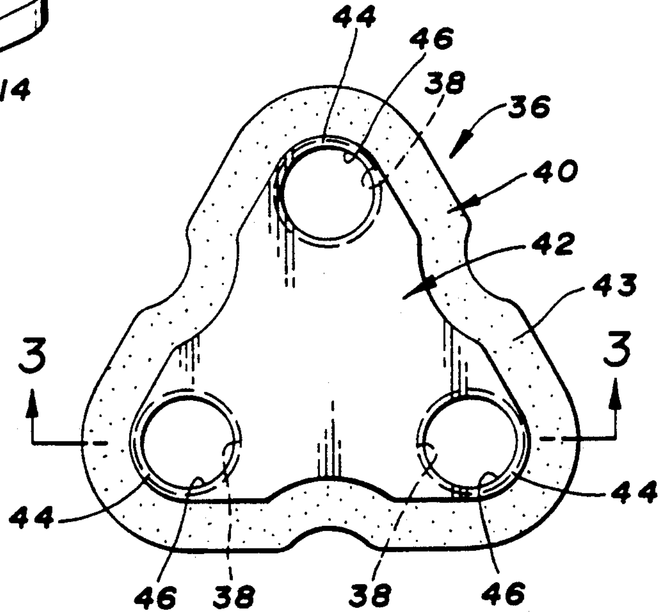
FIG. 2 is a bottom view of a heat deflector assembly embodying the present invention.
Figure 3:
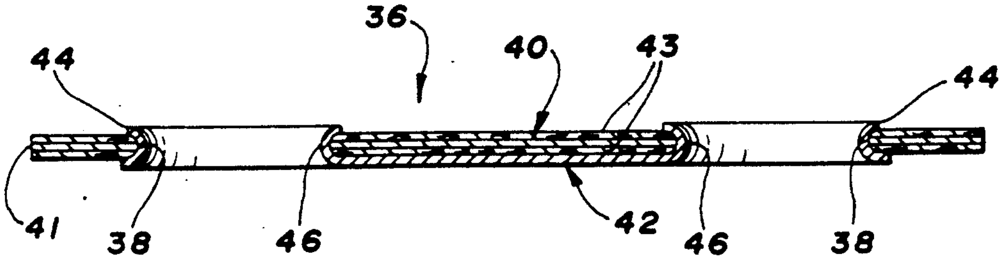
FIG. 3 is a side view of the heat deflector assembly of FIG. 2.

Disposed between cover 22 and base 12 is a heat deflector assembly 36, see FIGS. 2 and 3. The assembly 36 has opening 38 which aligns with valve seat 20 and is constructed from a flat, plate-like gasket member 40 which is seated in face-to-face engagement with the lower surface 26 of cover 22, so as to prevent impingement of exhaust gases thereon. Gasket member 40 is configured so as to form a seal between base 12 and cover 22 thereby preventing the egress of exhaust gases from EGR valve assembly 10 between cover 22 and exhaust chamber 14. The gasket member 40 is formed from an insulative material which acts to reduce the transfer of heat from exhaust chamber 14 through cover 22 to actuator 34. In the present embodiment, gasket member 40 is constructed from a stainless steel supporting member 41, sandwiched between layers of insulative material 43, although any suitable gasket material may be used.

The insulative material used to form gasket member 40 does not have a high durability in an exhaust environment. A stainless steel flat, plate-like heat deflector 42 is mounted to the lower surface of gasket member 40 so as to face the exhaust gases flowing through chamber 14 and thereby protect gasket member 40 from direct impingement by the exhaust gases. Additionally, heat deflector 42 acts to reduce the heat transferred to the gasket member 40. Stainless steel heat deflector 42 has a perimeter configuration which corresponds to the interior perimeter of exhaust chamber 14, as shown in FIG. 4. The perimeter configuration of deflector 42 provides substantially complete coverage of the lower surface of gasket member 40 within the confines of exhaust chamber 14 without interfering with the sealing function performed by gasket 40 between base 12 and cover 22.

As described above, the preferred embodiment utilizes a gasket member of a stainless steel and insulative material sandwich configuration. Other gasket member embodiments utilizing materials having greatly increased durability in an exhaust gas environment are also contemplated. Such gaskets, formed of ceramic materials, for example, will eliminate the need for a heat deflector member 42, further simplifying the heat deflector 36.

Attachment of heat deflector 42 to gasket member 40 is achieved using eyelet 44 which is formed about the perimeter of opening 38. The eyelet 44 may be formed integrally with heat deflector member 42, and passes upwardly through gasket member 40 where it is crimped about the gasket member thereby retaining the two members in a fixed relationship. As a result of forming eyelet 44 about the perimeter of opening 38, the heat deflector member 42 has an opening 46 which is generally aligned with valve seat 20.

In operation, as actuator 34 modulates valve stem 30 to open outlet opening 18, exhaust gases are allowed to pass through exhaust chamber 14 from inlet opening 16. As exhaust gases enter chamber 14, they are prevented from directly impinging on lower surface 26 of cover 22 by heat deflector assembly 36 thereby reducing heat transmission from exhaust chamber 14 to actuator 34. Additionally, insulative gasket member 40 is protected from the deleterious effects of the exhaust gases by heat deflector 42, thereby ensuring the durability of member 40 and further reducing heat transfer.

Figure 6:
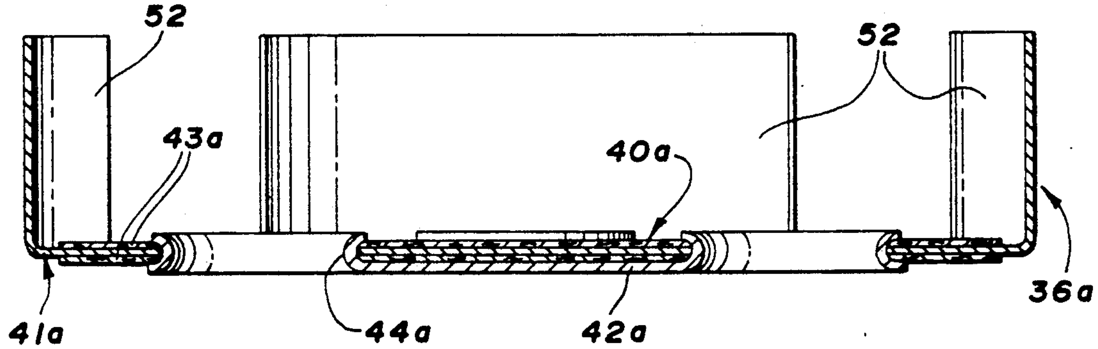
FIG. 6 is a side view of a second embodiment of a heat deflector assembly embodying the present invention.
Figure 7:
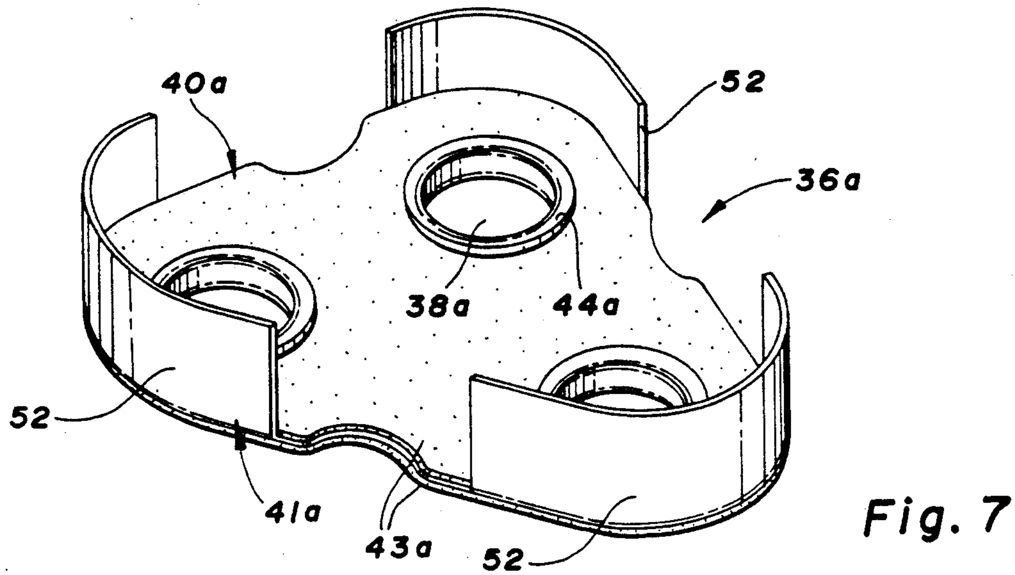
FIG. 7 is a perspective view of the heat deflector assembly of FIG. 6.

A second embodiment of the exhaust gas recirculation valve assembly is disclosed in FIGS. 5 through 7. In the Figures, features similar to those described above are denoted by like numerals followed by an "a" suffix.

In certain instances, which depend in large part on the particular application of EGR valve 10, moisture and other contaminants from road spray impinge on the valve 10, and in particular on the valve stem 30. In the second embodiment, heat deflector assembly 36a has a gasket member 40a which is constructed from a stainless steel supporting member 41a, sandwiched between layers of insulative material 43a. The supporting member 41a is configured to extend beyond the outer edges of the insulative material 43a to form a shield extension 52. The extension 52 is configured to extend in the axial direction a distance which will provide adequate protection from splash, without interfering with the operation of the valve. The extension 52 may extend about the entire perimeter of the valve or may be segmented as shown, to concentrate protection only in the area of valve stem/seal interface. A segmented construction reduces the heat retained between the base cover 22a and the actuator 34a by allowing air to circulate therebetween. Simultaneously, the extension 52 acts as a heat sink to conduct heat away from the valve and reduce heat transfer to the actuator.

Heat deflector assembly 36, 36a is an efficient solution to undesirable heat transfer through the EGR valve assembly 10, 10a in that it is simple in construction, easy to manufacture, and simple to install.

Furthermore, the attachment of heat deflector 42, 42a to gasket member 40, 40a assures proper alignment of the two members when installed thereby providing adequate protection of gasket member 40, 40a from direct impingement of exhaust gases.

While certain embodiments of the invention have been described in detail above in relation to an exhaust gas recirculation valve assembly, it would be apparent to those skilled in the art that the disclosed embodiment may be modified. Therefore, the foregoing description is to be considered exemplary, rather than limiting, and the true scope of the invention is that described in the following claims.

The embodiments of the invention in which an exclusive property or privilege is claimed are defined as follows:

1. An exhaust gas recirculation valve assembly comprising:

a base having an exhaust gas chamber with an inlet opening, an outlet opening, and a valve seat surrounding one of said openings;

a cover closing said exhaust gas chamber, said cover having upper and lower surfaces with an opening generally aligned with said valve seat;

a heat deflector assembly disposed between said lower surface of said cover and said exhaust gas chamber to lower the temperature of said cover, said heat deflector assembly comprising an insulative gasket member seated in face-to-face relationship with said lower surface of said cover exposed to said exhaust gas chamber, and extending beyond said chamber to form a seal between said cover and said base, and a heat deflector member fixedly attached, in face-to-face engagement, to the lower surface of said gasket member exposed to said exhaust gas chamber and having a perimeter configuration corresponding to the interior of said exhaust gas chamber and not extending beyond said chamber, said assembly having an opening generally aligned with said valve seat;

a valve stem extending through said cover opening;

a valve member mounted adjacent said valve seat at a first end of said valve stem; and an actuator operable on a second end of aid valve stem to operate said valve stem reciprocably into and out of engagement with said valve seat;

said heat deflector member useful to reduce heat transfer from said exhaust gas chamber to said gasket member and to prevent impingement of exhaust gases, flowing through said exhaust gas chamber, on said insulative gasket member.

2. An exhaust gas recirculation valve assembly, as defined in claim 1, wherein said heat deflector member is fixedly attached to said first, insulative gasket member by an eyelet, extending about the perimeter of said opening in said assembly, which is crimped about said members thereby retaining said members in engagement.

3. An exhaust gas recirculation valve assembly, as defined in claim 2, wherein said eyelet is formed integrally with said heat deflector member.

4. An exhaust gas recirculation valve assembly, as defined in claim 1, wherein said heat deflector member is formed from stainless steel.

5. An exhaust gas recirculation valve assembly comprising:

a base having an exhaust gas chamber with an inlet opening, an outlet opening, and a valve seat surrounding one of said openings;

a cover closing said exhaust gas chamber, said cover having upper and lower surfaces with an opening generally aligned with said valve seat;

a heat deflector assembly disposed between said lower surface of said cover and said exhaust gas chamber to lower the temperature of said cover, said heat deflector assembly having an opening generally aligned with said valve seat and comprising an insulative gasket member seated in face-to-face relationship with said lower surface of said cover exposed to said exhaust gas chamber, and extending beyond said chamber to form a seal between said cover and said base, and a heat deflector member fixedly attached, in face-to-face engagement, to the lower surface of said gasket member exposed to said exhaust gas chamber by an eyelet formed integrally with said heat deflector member and extending about the perimeter of said opening formed in said assembly and crimped about aid gasket member to retain said members in engagement, said heat deflector member further having a perimeter configuration corresponding to the interior of said exhaust gas chamber and not extending beyond said chamber;

a valve stem extending through said cover opening;

a valve member mounted adjacent said valve seat at a first end of said valve stem; and an actuator located at a second end of said valve stem, said actuator energizable to operate said valve stem reciprocably into and out of engagement with said valve seat;

said deflector member useful to reduce heat transfer from said exhaust gas chamber to said gasket member and to prevent impingement of exhaust gases, flowing through said exhaust gas chamber, on said insulative gasket member.

6. An exhaust gas recirculation valve assembly, comprising:

a base having an exhaust gas chamber with an inlet opening, an outlet opening, and a valve seat surrounding one of said openings;

a cover closing said exhaust gas chamber, said cover having upper and lower surfaces with an opening generally aligned with said valve seat;

a valve stem extending through said cover opening;

a valve member mounted adjacent said valve seat at a first end of said valve stem;

an actuator operable on a second end of said valve stem to operate said valve stem reciprocably into and out of engagement with said valve seat; and a heat deflector assembly disposed between said cover and said base, with an opening generally aligned with said valve seat, said assembly comprising a first, insulative gasket member, having upper and lower insulative layers and a supporting member disposed therebetween, seated in face-to-face relationship with said lower surface of said cover, configured to form a seal between said cover and said base, said supporting member of a dimension larger than said upper and lower insulative layers to extend outwardly therefrom to form an extension, said extension configured to extend in the axial direction a distance suitable to shield said valve stem, and a second, stainless steel heat deflector member mounted to the lower surface of said first member in face-to-face engagement therewith, having a perimeter configuration corresponding to the interior perimeter of said chamber;

said first, insulative gasket member useful to reduce heat transfer from said exhaust gas chamber to said actuator, said second, heat deflector member useful to reduce heat transfer from said exhaust chamber to said gasket member and to prevent impingement of exhaust gas, flowing through said exhaust gas chamber, on said first, gasket member, and said extension useful to shield said valve stem from impingement thereon of moisture and contamination.

7. An exhaust gas recirculation valve assembly, as defined in claim 6, wherein said extension is segmented to allow air circulation between said cover and said actuator.

* * * * *